United States Patent
Haswarey et al.

(10) Patent No.: US 7,149,820 B2
(45) Date of Patent: Dec. 12, 2006

(54) ENHANCED VPD (VITAL PRODUCT DATA) STRUCTURE

(75) Inventors: Asif H. Haswarey, Newark, CA (US); Francesco R. DiMambro, San Jose, CA (US); Sumanth R. Kamatala, Milpitas, CA (US); Anil Umarshi Visariya, Mountain View, CA (US); David M. Kahn, Princeville, HI (US)

(73) Assignee: Sun Microsystems, Inc., Santa Clara, CA (US)

( * ) Notice: Subject to any disclaimer, the term of this patent is extended or adjusted under 35 U.S.C. 154(b) by 590 days.

(21) Appl. No.: 10/208,908

(22) Filed: Jul. 30, 2002

(65) Prior Publication Data

US 2004/0025089 A1 Feb. 5, 2004

(51) Int. Cl.
*G06F 3/00* (2006.01)

(52) U.S. Cl. .............................. 710/8; 710/16; 710/62; 707/101; 707/102; 719/321

(58) Field of Classification Search ................ 707/101, 707/102; 710/9, 10, 11, 12, 63, 64, 65
See application file for complete search history.

(56) References Cited

U.S. PATENT DOCUMENTS

| | | | | |
|---|---|---|---|---|
| 5,438,674 A | * | 8/1995 | Keele et al. ................... 711/4 |
| 5,630,076 A | * | 5/1997 | Saulpaugh et al. .......... 710/104 |
| 5,802,365 A | * | 9/1998 | Kathail et al. ............... 719/321 |
| 5,901,310 A | * | 5/1999 | Rahman et al. ................. 713/1 |
| 6,219,828 B1 | * | 4/2001 | Lee ............................. 717/129 |
| 2002/0124007 A1 | * | 9/2002 | Zhao .......................... 707/102 |

OTHER PUBLICATIONS

"Data structure" definition=>NIST.*

* cited by examiner

*Primary Examiner*—Kim Huynh
*Assistant Examiner*—Alan S. Chen
(74) *Attorney, Agent, or Firm*—Park, Vaughan & Fleming LLP

(57) ABSTRACT

An enhanced VPD structure includes a type field to indicate whether a particular property is a general property to be associated with an interface card or other computer system component, or a device- or function-specific property to be associated with one or more devices or functions. The enhanced VPD structure also includes fields for identifying the device(s) and/or function(s) to which a device- or function-specific property applies, along with the value of the property, a data type and length of the property, and a meaningful name of the property. The enhanced VPD structure may be accessed during system boot, during hot-swapping of an interface card or other component, or at other times.

22 Claims, 3 Drawing Sheets

| | Key 210 | Record Length 212 | Record Type 214 | Device 216 | Function 218 | Property Type 220 | Property Length 222 | Property Name 224 | Property Value 226 |
|---|---|---|---|---|---|---|---|---|---|
| Record 250 | Z0 | 0x19 | M | 0x00 | 0x00 | S | 0x04 | vpd-version | 1.0 |
| Record 252 | Z1 | 0x17 | M | 0x00 | 0x00 | S | 0x0c | model | SUNW, pci-ce |
| Record 254 | Z2 | 0x1a | M | 0x00 | 0x00 | S | 0x09 | board-model | 501-5556 |
| Record 256 | Z3 | 0x1a | M | 0x00 | 0x00 | S | 0x0b | s-fru-dev | fcode-prom |
| Record 258 | Z4 | 0x13 | M | 0x00 | 0x00 | I | 0x04 | s-fru-offset | e000 |
| Record 260 | Z5 | 0x13 | M | 0x00 | 0x00 | I | 0x04 | s-fru-length | 100 |
| Record 262 | Z6 | 0x1a | M | 0x00 | 0x00 | S | 0x0b | d-fru-dev | fcode-prom |
| Record 264 | Z7 | 0x13 | I | 0x00 | 0x00 | I | 0x04 | d-fru-offset | e800 |
| Record 266 | Z8 | 0x13 | I | 0x00 | 0x00 | I | 0x04 | d-fru-length | 800 |
| Record 268 | Z9 | 0x1d | I | 0x00 | 0x00 | B | 0x06 | local-mac-address | 080020 aabbcc |
| Record 270 | Za | 0x12 | I | 0x00 | 0x00 | S | 0x04 | phy-type | mif |
| Record 272 | Zb | 0x1d | I | 0x08 | 0x00 | B | 0x06 | local-mac-address | 080020 aabbcd |
| Record 274 | Zc | 0x12 | I | 0x08 | 0x00 | S | 0x04 | phy-type | pcs |

ENHANCED VPD DATA STRUCTURE 202

FIG. 2

ENHANCED VPD (VITAL PRODUCT DATA) STRUCTURE

BACKGROUND

This invention relates to the field of computer systems. More particularly, a system and methods are provided for identifying device-specific properties of a device within a computer system.

Many computer systems are equipped to receive interface cards or boards for enhancing the capability of the systems. An interface card may include one or more devices, such as an Ethernet device for interfacing with a network, a USB (Universal Serial Bus) for interfacing with peripheral equipment, and so on.

Interface cards are often configured to connect to a local communication bus within a computer system. For example, the PCI (Peripheral Computer Interconnect) architecture provides a standard format for interconnecting interface cards with a computer system via one or more PCI buses.

In the PCI architecture and other architectures, an interface card will generally be programmed or equipped with properties that may be associated with the card (e.g., a manufacturer identifier, a card version), and a special FCode program for retrieving them. The FCode program and card properties may be stored in a Programmable Read-Only Memory (PROM), expansion ROM, or other non-volatile form of memory.

During initialization (e.g., booting) of the computer system, the FCode program is retrieved and executed, and the card's properties are read and associated with the card to facilitate operation of the card. However, not every computer system is equipped with the FCode interpreter and, even if a computer system includes the FCode interpreter, it may be configured to only run during system boot. The interpreter would not run, therefore, if one interface card is hot-swapped with another, and the replacement card's properties would not be obtained.

One reason the FCode interpreter is needed to access the properties is the form in which the properties are stored. For example, the PCI specification requires properties to be stored in a cryptic form. Specifically, the data structure only provides for three fields for a property: name, length and value. The name field is limited to two or three characters in size, which means that the card properties stored on the card must be identified by cryptic codes that are too small to provide a meaningful indication of the nature of the properties.

Further, the format of the data structure in which the properties are stored does not provide for the association of a specific property with a specific device on the card. For example, if an interface card includes more than one device of a particular type or nature (e.g., two Ethernet devices), the data structure cannot associate a particular property (e.g., type of Ethernet media, network address) with a specific device.

SUMMARY

In one embodiment of the invention, an enhanced VPD structure is provided to facilitate the association of properties with components of a computer system (e.g., an interface card), devices on such components and/or functions of such devices. In another embodiment of the invention, a method is provided for parsing a data structure in which device-specific properties may be stored.

In an embodiment of the invention, an enhanced VPD structure includes a type field to indicate whether a particular property is a general property to be associated with an interface card or other computer system component, or a device- or function-specific property to be associated with one or more devices or functions. The enhanced VPD structure also includes fields for identifying the device(s) and/or function(s) to which a device- or function-specific property applies, along with the value of the property, a data type and length of the property, and a meaningful name of the property. The enhanced VPD structure may be accessed during system boot, during hot-swapping of an interface card or other component, or at other times.

In one embodiment of the invention, an enhanced VPD structure may be stored in a nonvolatile memory (e.g., PROM, EEPROM) that may also contain a program (e.g., an FCode program) for retrieving properties from the enhanced VPD structure. When a property is retrieved, if a record type of the property indicates the property corresponds to an interface card or other system component (e.g., motherboard), the property is associated with that component. If the record type indicates the property corresponds to a particular device and/or function, then device and/or function identifiers are retrieved from the record and the property is associated with the identified device(s) and/or function(s).

DESCRIPTION OF THE FIGURES

FIG. 2 depicts the format of an enhanced VPD (Vital Product Data) data structure, in accordance with an embodiment of the present invention.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, expansion cards, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, an enhanced Vital Product Data (VPD) data structure is provided for storing or indicating properties of one or more devices operating on an interface card (or other component of a computer system), and/or properties of a device's function(s). An interface card or other component that comprises a device may be configured in accordance with the PCI (Peripheral Computer Interconnect) architecture (e.g., PCI Local Bus Specification 2.1), or some other applicable specification or architecture.

In another embodiment of the invention, an apparatus or system comprising an enhanced VPD data structure is provided—such as a nonvolatile memory, an interface card, a computer system, etc. In yet other embodiments of the invention, methods of parsing and/or using an enhanced VPD data structure are provided.

Figure 1:
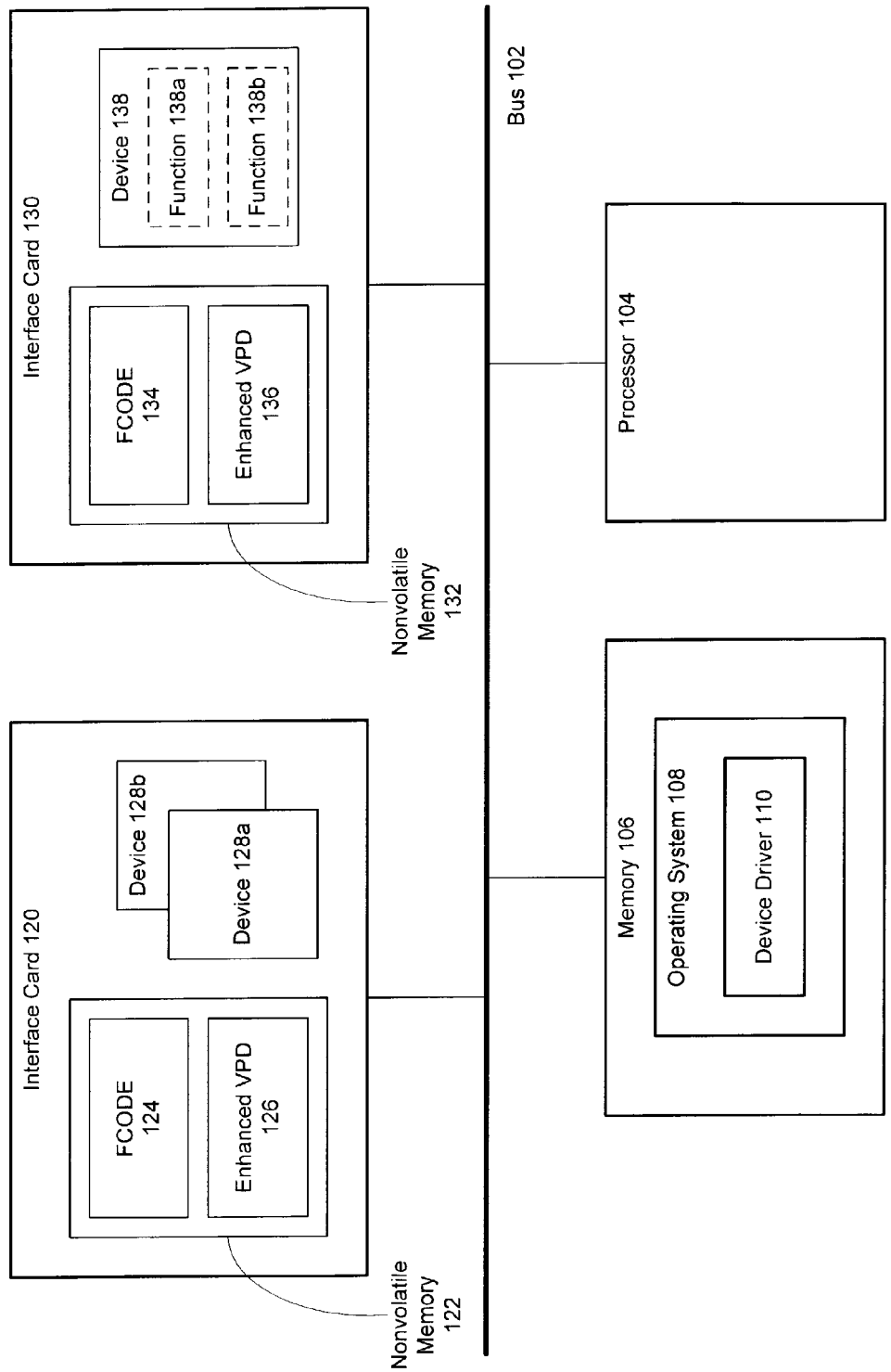
FIG. 1 is a block diagram of a computer in which an embodiment of the present invention may be implemented.

FIG. 1 depicts a computer system configured according to the PCI specification or other applicable architecture. The system of FIG. 1 includes bus 102, which may comprise a system bus and/or one or more local buses or bridges for interconnecting different components of the system. Coupled to bus 102 are processor 104, memory 106 and interface cards 120, 130. Although two distinct interface cards are depicted in the illustrated embodiment of the invention, in other embodiments of the invention any number of interface cards (including zero) may be included in a computer system.

In the illustrated embodiment, memory 106 comprises volatile memory used by processor 104 during operation of the computer system. Thus, memory 106 is configured to store all or a portion of operating system 108 (e.g., Solaris by Sun Microsystems, Inc.), which comprises one or more device drivers, such as device driver 110. Operating system 108 and device driver 110 are configured for execution by processor 104. Any number of device drivers may be included in different embodiments of the invention.

Illustratively, device driver 110 is configured to facilitate operation of an interface card, a device operating on one of interface cards 120, 130, or some other device within the computer system. More specifically, device driver 110 may facilitate operation of a communication device (e.g., an Ethernet, USB (Universal Serial Bus), SCSI (Small Computer Systems Interface) or other communication port), a storage device (e.g., a disk drive, a tape drive), or some other device.

In embodiments of the invention described herein, the use of a device corresponding to device driver 110 may be improved by the association of one or more device-specific properties that make operation or management of the device easier. Device-specific properties may include an address, a version, a part number, a media type, etc.

Each of interface cards 120, 130 includes a nonvolatile memory—nonvolatile memories 122, 132, respectively. Within each nonvolatile memory are an FCode program (FCode programs 124, 134) and an enhanced VPD data structure (enhanced VPD structures 126, 136). Also, each interface card comprises one or more devices, any or all of which may have corresponding device drivers residing in memory 106 or executed by processor 104. The FCode language is defined by IEEE Standard 1275-1994 Standard for Boot Firmware.

Thus, interface card 120 comprises devices 128a, 128b, while interface card 130 comprises device 138. In one alternative embodiment of the invention, a device may be configured on or in some other portion of a computer. For example, a device may be installed on a motherboard.

In one embodiment of the invention, a computer or interface card may comprise any number of devices. Among the devices of an interface card or computer system, any number may be of the same or similar type (e.g., Ethernet devices, USB devices), may be of the same media type (e.g., copper, fiber), may have other properties in common (e.g., version, data rate), or may be of different types or have different properties (e.g., address, media type).

In the illustrated embodiment of the invention, an interface card or other component of a computer that includes a device also includes a nonvolatile memory configured to contain properties that correspond to the device(s) or card (or other component). As shown in FIG. 1, the nonvolatile memory may also include an FCode program or other set of computer executable instructions for identifying the device(s) and/or retrieving the properties for association with the device(s). Each FCode program or set of instructions may be tailored to the device(s) it accompanies.

However, in other embodiments of the invention, one nonvolatile memory, program (e.g., FCode program) or set of properties may be used for more than one interface card or other computer system component that includes one or more devices. Or, a common program and/or set of properties may be installed in one or more nonvolatile memories, with each property only being associated with devices, cards or other components that are appropriate. Other permutations of devices, interface cards, other computer system components, nonvolatile memories, FCode (or other) programs, and corresponding sets of properties are also possible within the scope of the invention.

Also, as one skilled in the art will appreciate, one device may be configured with multiple functions. For example, device 138 of interface card 130 of FIG. 1 may comprise Ethernet, USB and/or other functions (e.g., functions 138a, 138b). Therefore, in addition to associating device-specific properties with a device, an embodiment of the invention may provide for function-specific properties to be associated with specific functions of a multi-function device. The various permutations for matching properties with devices, programs to access the properties, and nonvolatile memories that are described above, may be expanded accordingly.

In different embodiments of the invention, properties stored in an enhanced VPD structure may be retrieved during the initialization or booting of a computer, in conjunction with the hot-swapping of an interface card or device, or at some other time. In addition, the enhanced VPD structure may be accessed by a boot process (e.g., an Open Boot PROM), a device driver (e.g., a driver associated with a hot-swapped card or device) or other program.

In one embodiment of the invention, an enhanced VPD data structure is compatible with a traditional form of a VPD data structure (e.g., according to the VPD definition of version 2.1 of the PCI Local Bus specification), but is used to store information beyond that which is accommodated by a traditional implementation. As one of ordinary skill in the art will recognize, a traditional VPD data structure provides three fields: a key, a record length, and a value associated with the key. Each key/value pair may correspond to a particular property. For example, illustrative records in a traditional VPD structure may be similar to the following:

| | | |
|---|---|---|
| MI | 0x11 | Sun Microsystems |
| NA | 0x0c | 080020ddeeff |

In these examples, the key values signal that the records relate to a manufacturer's identity (MI) and a network address (NA), respectively. The length field indicates the length of the value field, which contains the identity or address. It may be noted that this type of record provides no easy recognition of what the value relates to ("MI" and "NA" may be plausible abbreviations of other properties). Also, there is no indication of the data type of the values.

In an embodiment of the invention, the "value" field of a traditional VPD data structure is replaced with, or re-defined to include, a plurality of fields or sub-fields providing a variety of information beyond that available in the traditional VPD data structure. In an enhanced VPD data structure, a record may identify and associate a property with one or more specific devices, and one or more functions, on one or more interface cards. The enhanced VPD may also include records that provide general information, which may relate to the interface card or other system component that hosts a device, or which may relate to all devices or functions corresponding to the VPD.

FIG. 2 depicts an enhanced VPD data structure according to one embodiment of the invention. VPD data structure 202 comprises one or more records. Record 204 indicates the format of an enhanced VPD record in this embodiment. One skilled in the art will appreciate that the configuration of the enhanced VPD data structure depicted in FIG. 2 and described herein may be altered to include any or all of the identified fields or information, and/or others not depicted, in the same or different format, without exceeding the scope of the present invention.

Each record of data structure 202 includes the following fields, any or all of which may be populated with appropriate data: key 210, record length 212, record type 214, device 216, function 218, property type 220, property length 222, property name 224 and property value 226. Records 250–274 are illustrative property records that may be included in an enhanced VPD.

Embodiments of the invention are not limited to the indicated records or the values reflected in any of the records. One or more fields of an enhanced VPD record may be blank or filled with default data. In the illustrated embodiment of the invention, a "device" or "function" refers to a device or function as defined in the PCI Local Bus Specification 2.1.

Key 210 comprises a keyword, which may be of a size (e.g., two characters) compatible with traditional VPD data structures. In one embodiment, key 210 contains one of the keys reserved in the PCI specification (e.g., for manufacturer or vendor use). In particular, in one implementation of the illustrated embodiment, key value 210 may be any of the following: Z0, Z1 . . . , Z9, Za, Zb, . . . , Zz, ZA, ZB, . . . , ZZ. In other embodiments, other keywords may be used.

Record length 212 is a value indicating the combined length of all fields of a record, other than key 210 and record length 212. Thus, record length 212 stores the length of the multiple fields that are stored in place of the "value" field of a traditional VPD data structure.

In the embodiment of FIG. 2, record type 214 identifies the type of the record, which may indicate the scope or nature of the property. In particular, record type 214 may store a first code or value to indicate that the record's property relates to an interface card or other system component in general (e.g., card model, product name, version), or a second code or value to indicate that the property corresponds to one or more specific devices and/or functions of a device (e.g., local-mac-address, phy-type). In one implementation, the first code or value may comprise a character such as "M" to indicate a meta property, and the second code or value may comprise a different character, such as "I", to indicate its relation to one or more instances of a device or function.

Device field 216 may contain meaningful data only when record type 214 is "I" or otherwise indicates that the record corresponds to a device and/or function. Otherwise, device 216 may be ignored or populated with default or meaningless data. Device 216 may correspond to a device number or identifier of a device, which may be hard-coded (e.g., in firmware) in the device or the interface card or other component hosting the device.

Illustratively, device 216 may comprise a special value (e.g., −1) to indicate that the property value corresponds to multiple devices (e.g., all devices on the current interface card, all devices on the current PCI (or other) bus, all devices of a particular type). Or, device 216 may store an identifier (e.g., device number) of a specific device if the property is to be associated with just that device. The first device of an interface card or other computer component may be numbered zero.

Function 218 may also store meaningful data only when record type 214 is "I" or otherwise indicates that the record corresponds to a device and/or function. Function 218 may store a special value (e.g., −1) if the record property is to be associated with all functions of the device(s) specified by device 216. Otherwise, function 218 may store an identifier (e.g., a PCI function number) of a specific function of the device(s). The first (or only) function of a device may be numbered zero.

Property type 220, in the embodiment of FIG. 2, identifies a data type of property value 226. In one implementation, property type 220 may take one of the following values: "B" to indicate that the property value is a byte array (e.g., the property may be a MAC address), "I" to indicate that the property value is encoded in integers, or "S" to indicate that the property value is a string.

Illustratively, if of the type byte array, the property value may be stored unencoded, with the first byte of the byte sequence being stored at the lowest address. If of integer type, each integer may be thirty-two bits in size and encoded in an unaligned byte array in big endian format. A string property value may be null-terminated.

Property length 222 indicates the length of the record's property value field 226. Illustratively, it will indicate the length of the byte array if the property value is of that type, the number of integers in a property value of that type, or the length of a string type property value, including any null-terminator(s).

Property name 224 identifies the property stored in the record (e.g., by name). The property name field may comprise a null-terminated string.

Property value 226 is the value of a property that may be associated with the interface card (or other computer system component) on which enhanced VPD data structure 202 is configured, or some other interface card, or one or more devices or functions of an interface card or other system component. Property value 226 may start immediately after the null terminator of property name 224.

In one alternative embodiment of the invention, device 216 and/or function 218 may store predetermined values in a record if the property of that record is a general or meta property corresponding to an interface card or some component other than a specific device (or a function of a device). In this alternative embodiment, record type 214 may then be unnecessary.

Figure 3:
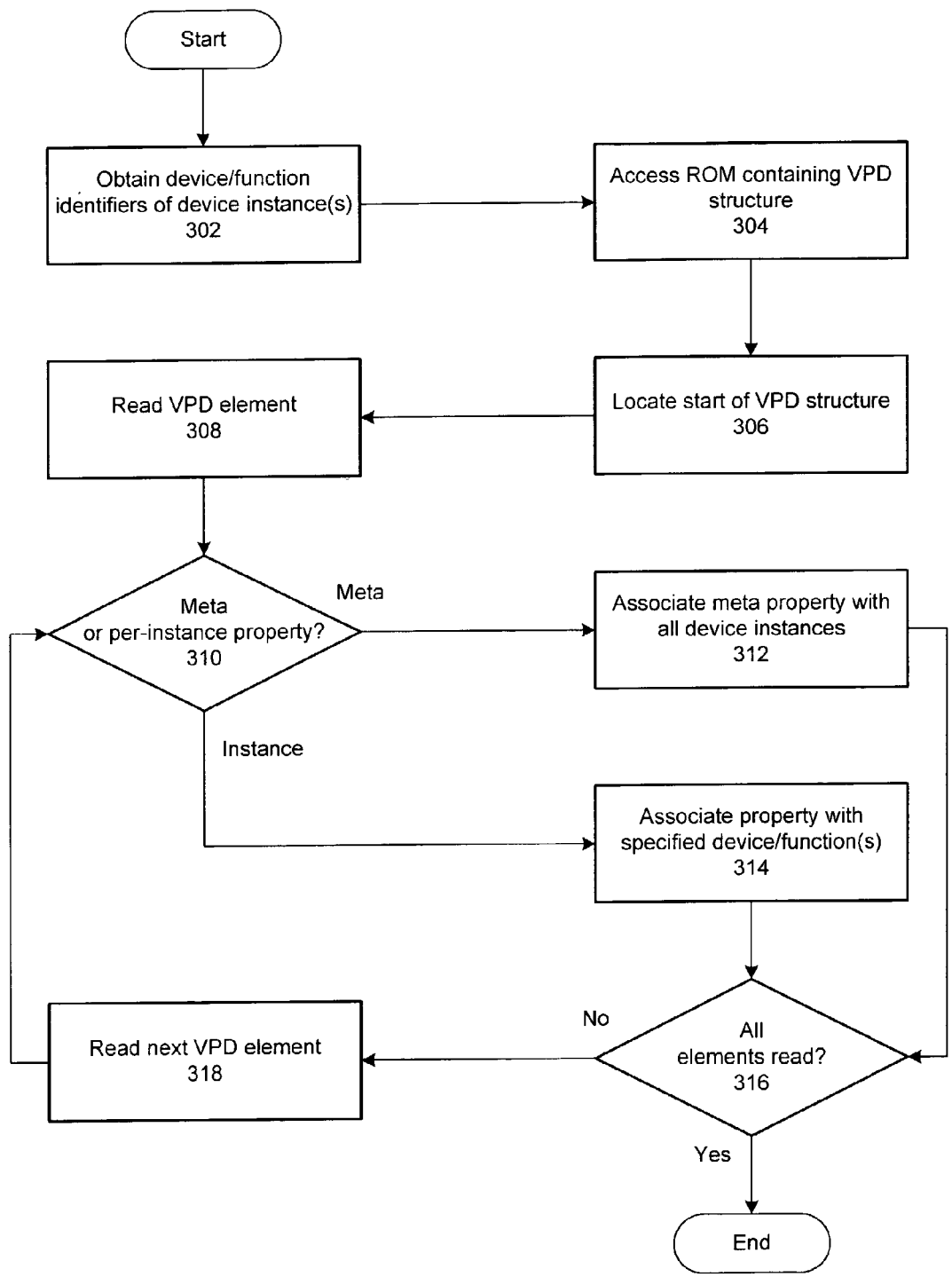
FIG. 3 is a flowchart illustrating one method of parsing an enhanced VPD data structure, in accordance with an embodiment of the invention.

FIG. 3 demonstrates a method of parsing an enhanced VPD data structure, according to one embodiment of the invention. In the embodiment of FIG. 3, one or more communication devices or other device instances are configured on an interface card or other component of a computer system.

In operation 302, device and/or function identifiers of the devices (and their functions) are read from the devices or otherwise obtained. Illustratively, a per-device data structure may be constructed and maintained for each device by a device driver. The per-device data structure may store device/function properties and information.

In operation 304, the ROM or other module containing a VPD data structure for the interface card is accessed. This may entail a search for the ROM, testing for a specific PROM signature, determination of whether an interface to the ROM is enabled, etc.

In operation 306, the VPD structure is located within the ROM. Illustratively, a specific data pattern may signal the beginning of the VPD structure. When the start of the VPD structure is located, some initial information (e.g., id string, product name) may be skipped to reach the first record of the structure.

In operation 308 the first VPD record is read from the structure. As demonstrated in FIG. 2, the record may comprise a variety of fields.

In operation 310, it is determined whether the property described in the VPD record is a meta property (e.g., applicable to the interface card in general or all devices on the card) or a property that is to be associated with one or more specific devices/functions. If it is a per-instance property, the illustrated method advances to operation 314.

In operation 312, the meta property (the property value) is associated with the interface card and/or each device configured on the card. This may entail storing the property value in each device's per-device data structure. The method then proceeds to operation 316.

In operation 314, the per-instance property is associated with the devices/functions specified in the record. This may entail storing the property value in each device's per-device data structure.

In operation 316, it is determined whether all records of the VPD structure have been read. If so, the method ends.

Otherwise, in operation 318 the next VPD record is read and the method returns to operation 310.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A nonvolatile computer readable storage medium containing a data structure configured to store properties associable with one or more electronic devices within a single computer, wherein none of the properties identify a driver for an associable electronic device, and each property within the data structure comprises:

a key, wherein said key is unique within the data structure;
a property name comprising a name of a property;
a property value comprising a value for said property;
a property length comprising a length of said property value;
a data type of said property value;
a device identifier configured to identify one or more devices of a computer system; and
a function identifier configured to identify a function of said one or more devices;
wherein the data structure does not comprise or identify a driver for an associable electronic device; and
wherein at least one property is read from the data structure and used to configure the one or more electronic devices within the single computer.

2. The nonvolatile computer readable storage medium of claim 1, further comprising a record type comprising one of:
a first code if said property is associable with a computer system component comprising a set of devices; and
a second code if said property is associable with said one or more devices.

3. The nonvolatile computer readable storage medium of claim 2, wherein said device identifier comprises a predetermined value if said property value is associable with every device in said set of devices.

4. The nonvolatile computer readable storage medium of claim 2, wherein the computer system component is an interface card.

5. A nonvolatile computer readable storage medium containing a data structure configured to store a device-specific property associable with one or more electronic devices of a single computer, the device-specific property comprising:
a key, wherein said key is unique within the data structure;
a property name comprising a meaningful name of a property;
a property value comprising a value for said property;
a property length comprising a length of said property value;
a data type of said property value;
a record type comprising one of:
    a first code if said property is as sociable with a computer system component comprising a set of devices; and
    a second code if said property is associable with one or more of said devices; and
if said record type comprises said second code:
    a device identifier configured to identify said one or more devices;
    a function identifier configured to identify a function of said one or more devices; and
    a record length indicating a combined length of said property name, said property value, said property length, said data type, said record type, said device identifier and said function identifier;
wherein said device-specific property is read from said data structure and used to configure the one or more electronic devices.

6. A hardware interface module for a single computer, the hardware interface module comprising:
one or more electronic devices, including a first device having one or more functions;
a nonvolatile memory configured to store a set of properties associable with one or more of:
    the hardware interface module; and
    said first device; and a set of computer executable instructions configured to facilitate retrieval of said set of properties from said nonvolatile memory;

wherein each property in said set of properties comprises:
- a value of said property;
- a name of said property;
- a data type of said value;
- a scope configured to identify a scope of said property; and
- if said scope indicates a device scope:
  - a device identifier configured to identify said first device; and
  - a function identifier configured to identify a first function of said first device; and wherein the set of properties is read and used to configure one or more of the hardware interface module and said first device.

7. The hardware interface module of claim 6, wherein said device identifier is configured to identify multiple devices, including said first device.

8. The hardware interface module of claim 6, wherein said function identifier is configured to identify multiple functions, including said first function.

9. A method of associating a property with an electronic device within a single computer, the method comprising:
- accessing a nonvolatile memory configured to store properties of one or more devices of the single computer;
- retrieving from the nonvolatile memory a first property, said first property comprising:
  - a value of said first property;
  - a name of said first property;
  - a data type of said value;
  - a device identifier configured to identify a first device; and
  - a function identifier configured to identify a first function of said first device; and
- configuring said first device with said value;
- wherein said first property does not identify a device driver for operating said first device.

10. The method of claim 9, wherein said first property further comprises:
- a scope configured to indicate a scope of said first property, wherein said scope is one of:
  - a first scope indicating that said first property is to be associated with a device; and
  - a second scope indicating that said first property is to be associated with a component of the single computer that comprises a device.

11. The method of claim 9, wherein said associating comprises associating said first property value with said first function.

12. The method of claim 9, wherein said function identifier is configured to identify multiple functions, including said first function.

13. The method of claim 9, wherein said accessing, retrieving and associating are performed by a device driver of the single computer.

14. The method of claim 9, wherein said accessing, retrieving and associating are performed in conjunction with the hot-swapping of a component of the single computer; and
wherein said component comprises said first device.

15. The method of claim 9, further comprising:
executing an FCode program stored in the nonvolatile memory with said first property.

16. The method of claim 9, wherein said device identifier is configured to identify multiple devices, including said first device.

17. The method of claim 9, wherein the nonvolatile memory is part of a component of the single computer that comprises multiple devices, including said first device.

18. The method of claim 9, wherein the nonvolatile memory is part of a first component of the single computer; and
wherein said first device is part of a second component of the single computer.

19. The method of claim 9, further comprising:
determining whether said first property is a meta property to be associated with a module, within the single computer, that comprises said first device.

20. A computer readable storage medium storing instructions that, when executed by a computer, cause the computer to perform a method of associating a property with an electronic device within the computer, the method comprising:
- accessing a nonvolatile memory configured to store properties of one or more devices of a single computer;
- retrieving from the nonvolatile memory a first property, said first property comprising:
  - a value of said first property;
  - a name of said first property;
  - a data type of said value;
  - a device identifier configured to identify a first device; and
  - a function identifier configured to identify a first function of said first device; and
- configuring said first device with said value;
- wherein said first property does not identify a device driver for operating said first device.

21. A method of applying an enhanced Vital Product Data (VPD) data structure, comprising:
- identifying one or more devices, including a first device, on a hardware interface module of a single computer;
- accessing a non-volatile memory of the hardware interface module, wherein the non-volatile memory comprises a VPD data structure corresponding to said first device but does not comprise or identify a driver for said first device;
- parsing a first record of the VPD data structure, wherein said first record comprises:
  - a record type;
  - a first property; and
  - a value of said first property;
- determining, from said record type, whether said first property corresponds to the hardware interface module or said first device;
- if said first property corresponds to the hardware interface module, configuring the hardware interface module with said first property; and
- if said first property corresponds to said first device, configuring said first device with said first property.

22. The method of claim 21, wherein said associating said first property with said first device comprises:
storing said value in a data structure corresponding to said first device, wherein said data structure is maintained by a device driver of said first device.

* * * * *